US011250051B2

(12) United States Patent
Lawlor et al.

(10) Patent No.: US 11,250,051 B2
(45) Date of Patent: Feb. 15, 2022

(54) METHOD, APPARATUS, AND SYSTEM FOR PREDICTING A POSE ERROR FOR A SENSOR SYSTEM

(71) Applicant: HERE GLOBAL B.V., Eindhoven (NL)

(72) Inventors: David Johnston Lawlor, Chicago, IL (US); Anish Mittal, San Francisco, CA (US)

(73) Assignee: HERE GLOBAL B.V., Eindhoven (NL)

( * ) Notice: Subject to any disclaimer, the term of this patent is extended or adjusted under 35 U.S.C. 154(b) by 131 days.

(21) Appl. No.: 16/576,433

(22) Filed: Sep. 19, 2019

(65) Prior Publication Data

US 2021/0089572 A1 Mar. 25, 2021

(51) Int. Cl.
*G06F 16/587* (2019.01)
*G06T 7/73* (2017.01)
(Continued)

(52) U.S. Cl.
CPC ....... *G06F 16/587* (2019.01); *G06K 9/00657* (2013.01); *G06K 9/00791* (2013.01);
(Continued)

(58) Field of Classification Search
CPC combination set(s) only.
See application file for complete search history.

(56) References Cited

U.S. PATENT DOCUMENTS

2012/0063668 A1 3/2012 Zalmanson
2013/0300831 A1 11/2013 Mavromatis et al.
(Continued)

FOREIGN PATENT DOCUMENTS

WO 2018177484 A1 10/2018

OTHER PUBLICATIONS

Ababsa et al., "Smart Localization Using a New Sensor Association Framework for Outdoor Augmented Reality Systems", Research Article, Journal of Robotics, vol. 2012, Jun. 15, 2012, retrieved from http://downloads.hindawi.com/journals/jr/2012/634758.pdf, 15 pages.

(Continued)

*Primary Examiner* — Zhiyu Lu
(74) *Attorney, Agent, or Firm* — Ditthavong, Steiner & Mlotkowski

(57) ABSTRACT

An approach is provided for predicting a pose error for a sensor system based on a trained machine learning model. The approach, for example, involves receiving images depicting a survey point with a known physical location. The approach also involves determining meta-data associated with the sensor system used to capture the images. The approach further involves generating a ray from the capture location through a pixel location of the survey point on an image plane of each image. The approach further involves calculating an error between the ray generated for the image and the known physical location. The approach further involves training a machine learning model to predict a pose error from image data captured using the sensor system based on the error in combination with features extracted from the image and the meta-data for the image. The approach further involves providing the trained machined learning as an output.

20 Claims, 13 Drawing Sheets

(51) Int. Cl.
*G06N 20/10* (2019.01)
*G06K 9/00* (2022.01)

(52) U.S. Cl.
CPC .............. *G06N 20/10* (2019.01); *G06T 7/73* (2017.01); *G06T 2207/10032* (2013.01)

(56) References Cited

U.S. PATENT DOCUMENTS

| | | |
|---|---|---|
| 2016/0012589 A1 | 1/2016 | Hamer et al. |
| 2016/0247030 A1 | 8/2016 | Matsumoto |
| 2020/0111011 A1* | 4/2020 | Viswanathan ....... H04N 17/002 |
| 2021/0064902 A1* | 3/2021 | Connell ............. G01C 21/3837 |

OTHER PUBLICATIONS

Jovanovic, "In-flight Geometric Calibration Plan", Apr. 29, 1996, retrieved from https://eospso.gsfc.nasa.gov/sites/default/files/atbd/GEOCAL-MISR.pdf, 72 pages.

Office Action for related European Patent Application No. 20196990.4-1001, dated Feb. 17, 2021, 15 pages.

* cited by examiner

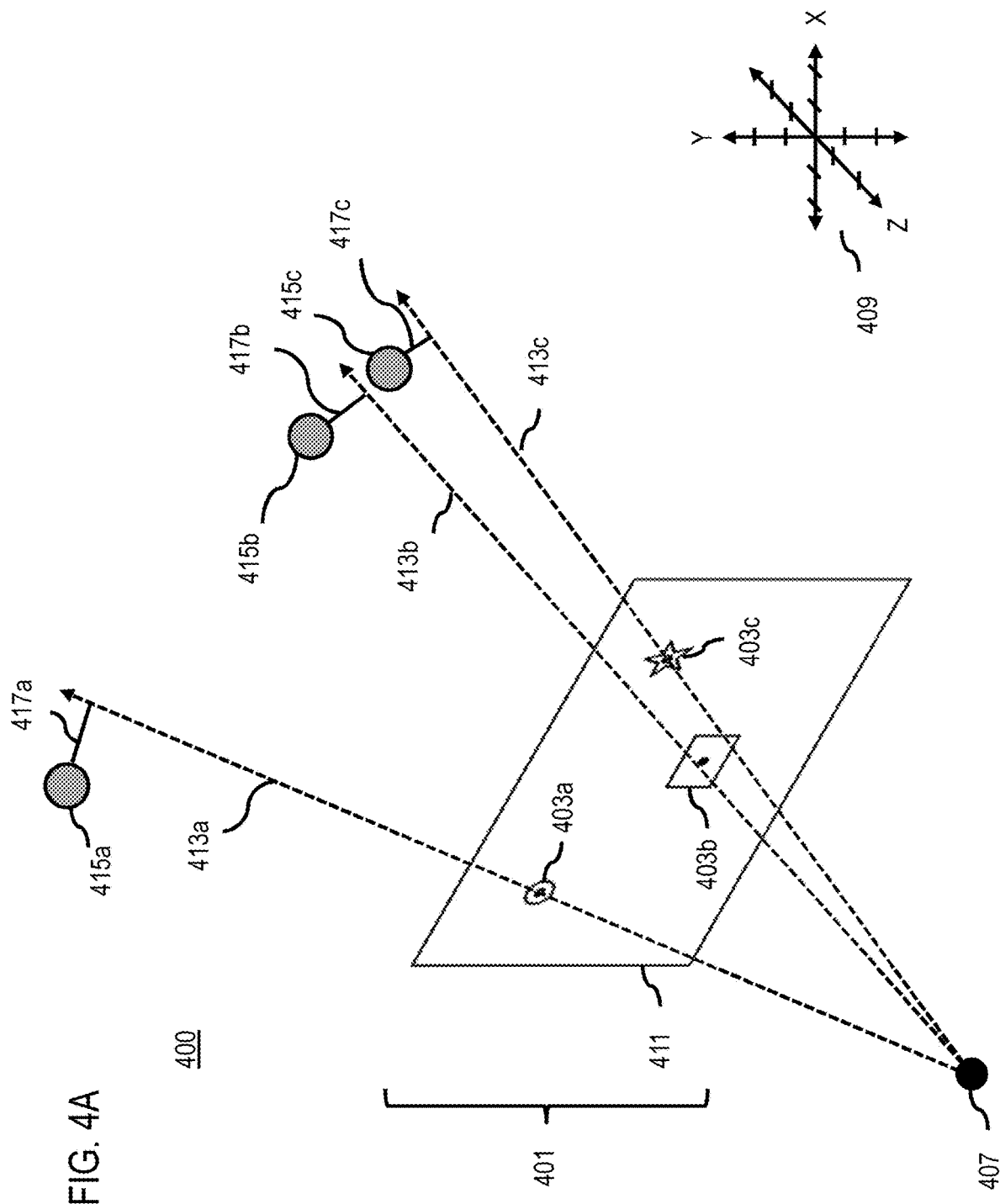

500

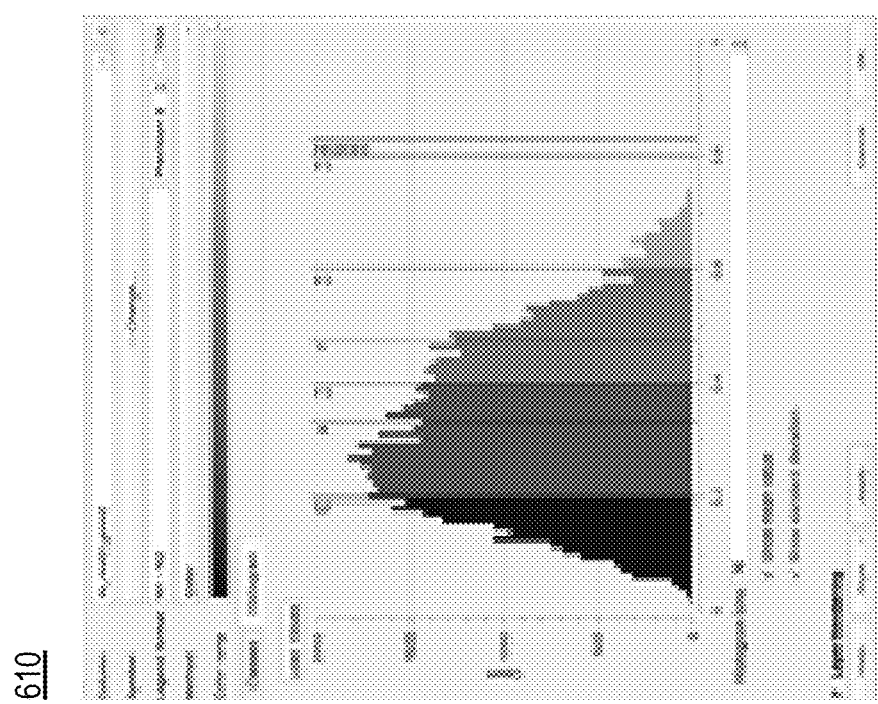
FIG. 6A

METHOD, APPARATUS, AND SYSTEM FOR PREDICTING A POSE ERROR FOR A SENSOR SYSTEM

BACKGROUND

Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected by a variety of sensor systems with different views or perspectives (e.g., top down imagery from aerial cameras, and ground-level imagery for surface vehicles, etc.), such as Global Positioning System (GPS), inertial measure unit (IMU), camera, Light Detection and Ranging (LiDAR), radio detection and ranging (Radar), etc. The images can originate from any number of sources, the resolution, quality, etc. of each image can vary. For example, the resolution of top imagery of different satellites or other aerial sources can vary depending on the kind of camera sensors used. These different sensors then produce images with different resolutions. Map service providers can then, for instance, identify common semantic features (e.g., lane markings, signs, etc.) across the image views for map making, localization, and/or other similar location-based services. To ensure precise semantic identification of semantic features the service providers must have accurate sensor system pose data. Accordingly, map service providers face significant technical challenges to estimate pose errors for a sensor system given that there are complicated internal and external circumstances accounted for the errors of position sensors of such sensor system.

SOME EXAMPLE EMBODIMENTS

Therefore, there is a need for an approach for predicting a pose error for a sensor system based on a trained machine learning model.

According to one embodiment, a computer-implemented method comprises receiving a plurality of images depicting a survey point, wherein the survey point has a known physical location. The method also comprises, for each image of the plurality of images, determining meta-data associated with a sensor system used to capture said each image, wherein the meta-data indicates at least a capture location of the sensor system when said each image was captured. The method further comprises generating a ray from the capture location through a pixel location of the survey point on an image plane of said each image. The method further comprises calculating an error between the ray generated for said each image and the known physical location. The method further comprises training a machine learning model to predict a pose error from image data captured using the sensor system based on the error in combination with a plurality of features extracted from at least one of said each image and the meta-data for said each image. The method further comprises providing the trained machined learning model as an output.

According to another embodiment, an apparatus comprises at least one processor, and at least one memory including computer program code for one or more computer programs, the at least one memory and the computer program code configured to, with the at least one processor, cause, at least in part, the apparatus to receive a plurality of images depicting a survey point, wherein the survey point has a known physical location. The apparatus is also caused to, for each image of the plurality of images, determine meta-data associated with a sensor system used to capture said each image, wherein the meta-data indicates at least a capture location of the sensor system when said each image was captured. The apparatus is further caused to generate a ray from the capture location through a pixel location of the survey point on an image plane of said each image. The apparatus is further caused to calculate an error between the ray generated for said each image and the known physical location. The apparatus is further caused to train a machine learning model to predict a pose error from image data captured using the sensor system based on the error in combination with a plurality of features extracted from at least one of said each image and the meta-data for said each image. The apparatus is further caused to provide the trained machined learning model as an output.

According to another embodiment, a non-transitory computer-readable storage medium carries one or more sequences of one or more instructions which, when executed by one or more processors, cause, at least in part, an apparatus to receive a plurality of images depicting a survey point, wherein the survey point has a known physical location. The apparatus is also caused to, for each image of the plurality of images, determine meta-data associated with a sensor system used to capture said each image, wherein the meta-data indicates at least a capture location of the sensor system when said each image was captured. The apparatus is further caused to generate a ray from the capture location through a pixel location of the survey point on an image plane of said each image. The apparatus is further caused to calculate an error between the ray generated for said each image and the known physical location. The apparatus is further caused to train a machine learning model to predict a pose error from image data captured using the sensor system based on the error in combination with a plurality of features extracted from at least one of said each image and the meta-data for said each image. The apparatus is further caused to provide the trained machined learning model as an output.

According to another embodiment, an apparatus comprises means for receiving a plurality of images depicting a survey point, wherein the survey point has a known physical location. The apparatus also comprises means for determining meta-data associated with a sensor system used to capture said each image, for each image of the plurality of images, wherein the meta-data indicates at least a capture location of the sensor system when said each image was captured. The apparatus further comprises means for generating a ray from the capture location through a pixel location of the survey point on an image plane of said each image. The apparatus further comprises means for calculating an error between the ray generated for said each image and the known physical location. The apparatus further comprises means for training a machine learning model to predict a pose error from image data captured using the sensor system based on the error in combination with a plurality of features extracted from at least one of said each image and the meta-data for said each image. The apparatus further comprises means for providing the trained machined learning model as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4A is a prospective view of an example of projecting rays to train a machine learning model to predict a pose error from image data, according to one embodiment;

FIGS. 6A-6B are diagrams of user interfaces illustrating examples of predicted pose errors of different classes for images captured in Washington DC by a sensor system, according to one embodiment;

DESCRIPTION OF SOME EMBODIMENTS

Examples of a method, apparatus, and computer program for predicting a pose error for a sensor system based on a trained machine learning model. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
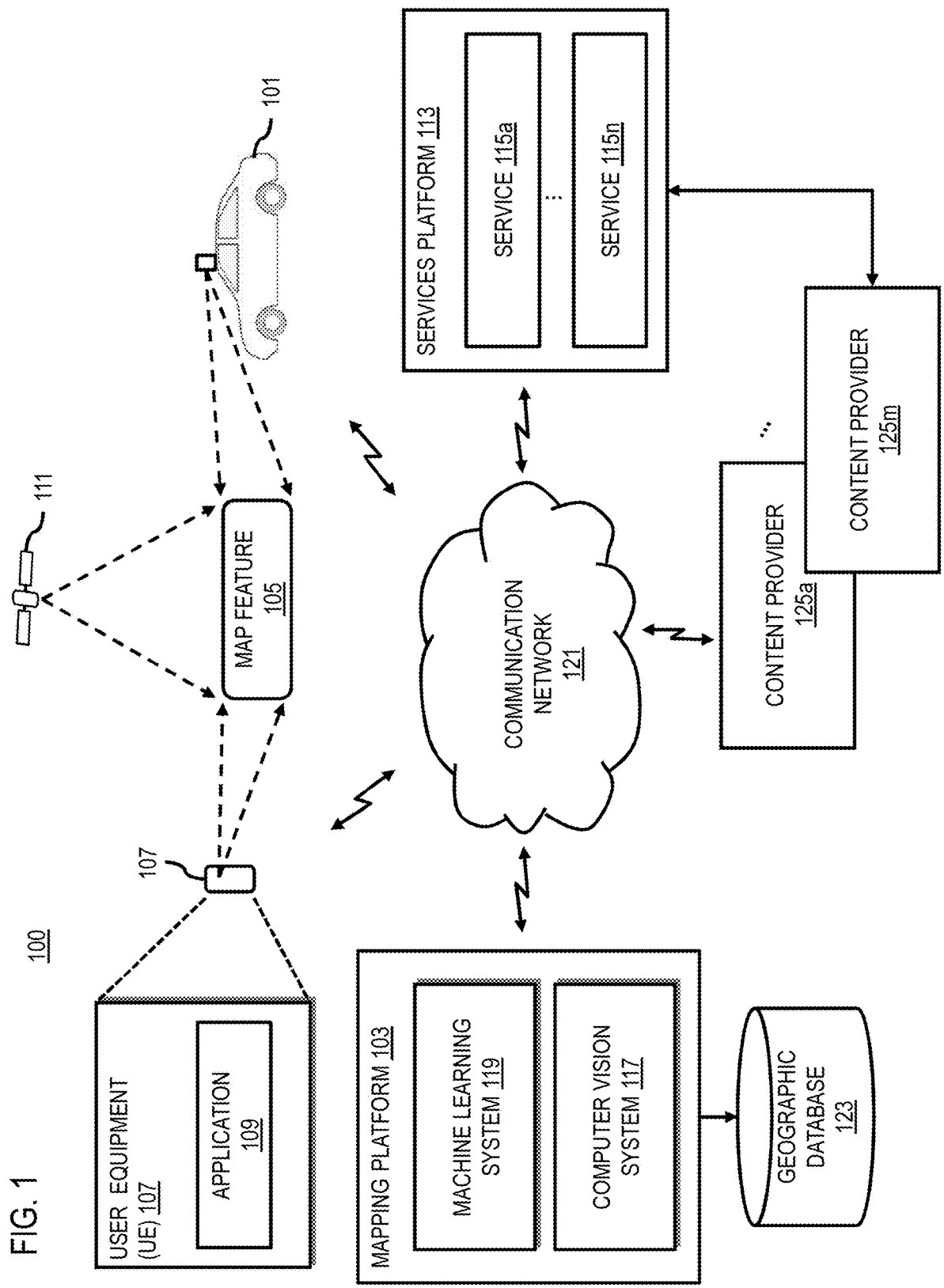
FIG. 1 is a diagram of a system capable of predicting a pose error for a sensor system based on a trained machine learning model.

FIG. 1 is a diagram of a system capable of predicting a pose error for a sensor system based on a trained machine learning model, according to one embodiment. As indicated above, many location-based services and applications rely on accurate map data. Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected from a variety of sources with different views or perspectives (e.g., top down imagery from aerial cameras, and ground-level imagery for surface vehicles, etc.). Map service providers can then, for instance, identify common semantic features (e.g., lane markings, signs, etc.) across the image views for map making, localization, and/or other similar location-based services.

However, image data collected by different sensor systems under different environmental circumstance may carry different pose errors. For example, images taken by satellites 111, LiDAR, aerial and drone images, etc., from a top down perspective, can be used to precisely determine the location of roads, and other features (e.g., map feature 105) on the Earth. Nevertheless, these image data may suffer from orbit errors, satellites/drone clock errors, etc. Ground sources like cars, robots, mobiles devices (e.g., user equipment, UE, 107) fitted with sensor systems (e.g., cameras, IMU, LiDAR, radar, etc.) are also used to acquire image data and build a mapping model using perception algorithms (e.g., an application 109). Processing ground sources generally requires more effort and resources on a city scale, yet detecting more detailed map features 105 like traffic lights, signs etc., which may not be visible from a top down image or source. These image data may suffer from errors caused by reflected signals entering the receiver antenna, errors in the receiver's measurement of range caused by receiver clock error, thermal noise, software accuracy, etc. In one embodiment, feature correspondences across different sources enables aggregating maps made from both top down and ground level sources for better accuracy and more completeness. However, since there are various sources accounted for a pose error in the image data, it is challenging to predict such pose error that aggregates all sources of errors associated with an image subsequently captured by a sensor system.

To address these problems, the system 100 of FIG. 1 introduces a capability for predicting a pose error for a sensor system based on a trained machine learning model, according to one embodiment. In one use case, the system 100 assists automated driving requires vehicles (e.g., an autonomous vehicle 101) to perceive the world with an accurate semantic understanding in order to obey driving rules and avoid collisions. For example, the system 100 operates a mapping platform 103 to creates highly accurate and up-to-date high-resolution map for automated driving, based on different sources of raw data (e.g., image data). In this example, images taken by satellites 111, aerial and drone images, etc., from a top down perspective, is used to precisely determine map feature 105 (e.g., the location of roads, and other features) on the Earth. Ground sources like cars, robots, user equipment (UE) 107 (e.g., mobiles devices) fitted with sensor systems (e.g., cameras, IMU, LiDAR, radar, etc.) are also used to acquire image data for building a mapping model using perception algorithms (e.g., an application 109). Processing ground sources generally requires more effort and resources on a city scale, yet detecting more detailed map features 105 like traffic lights, signs etc. which may not be visible from a top down image or source. For high definition map use (e.g., with centimeter level accuracy), the system 100 maps the features in an area using both top down and ground level sources.

In one embodiment, the system 100 initiates at least one drive by a vehicle configured with a sensor system of interest (e.g., GPS, IMU, camera, LiDAR, Radar, etc.) to capture a plurality of images. Rather than analyzing and predict errors per source, the system 100 predicts a pose error per sensor system. By way of example, the system 100 processes images taken by a sensor system of interest, which depict a survey point. The survey point has a known physical location. By way of example, the system 100 selects the survey point based on a presence of an environmental characteristic within a proximity threshold of the known physical location. The at least one environmental characteristic includes a tree canopy, an open sky area, an urban canyon, an natural canyon, or a combination thereof.

To facilitate and/or monitor the accuracy of digital map data stored in a geographic database 123, map service providers can designate survey points. In one embodiment, survey points (e.g., ground control points) are defined as identifiable points on the Earth's surface that have a precise location (e.g., in the form of <Latitude, Longitude, Elevation>) associated with each survey point. These survey points play a vital role in measuring the quality and correction of a data map source, such as a sensor system of interest.

The images are annotated with meta-data such as sensor system pose data and sensor system technical parameters (e.g., field of view, focal length, camera lens used, etc.). To simply the discussion, a single camera is used as an example of the sensor system (e.g., GPS, IMU, camera, LiDAR, Radar, etc.). The camera pose data includes position data (e.g., locations of the camera when the corresponding images were capture), orientation data (e.g., pointing direction), etc. Using the camera pose data, the system 100 can determine a capture location of the camera for an image. The system 100 can use the camera pose data and the camera parameters to generate a ray from the capture location through a pixel location of the survey point on an image plane of the image. The image plane, for instance, represents the location of the camera's fields of view in three-dimensional space, thereby enabling the system 100 to determine the relative orientation of the image with respect to each other. The system 100 then calculates an error between the ray generated for the image and the known physical location. In one embodiment, the error is the minimum distance between the generated ray and the known physical location of the survey point.

The system 100 can train a machine learning model to predict a pose error from image data captured using the camera based on the error in combination with a plurality of features extracted from the image and the meta-data for the image. Features refer to any feature that is photo-identifiable in the image including, but not limited to, physical features on the ground that can be used as possible candidates for survey points. In other words, it is contemplated that features refer to a broader category of photo-identifiable features than just survey points.

By way of example, the training can be carried out using a supervised machine learning scheme, such as random forests, support vector machines, or other statistical calculation (including but not limited to averaging, determining a median, determining a minimum/maximum, etc.), etc. Embodiments of the ray intersection technical solution described herein can be very computationally simple, and easy to implement based on pure geometry. This, in turn, enables the system 100 advantageously reduce the computing resources (e.g., processing power, memory, bandwidth, etc.) used for predicting a pose error for a sensor system (e.g., GPS, IMU, camera, LiDAR, Radar, etc.) based on a trained machine learning model.

The trained machine learning model can be used to process a plurality of other images to predict the pose error for the sensor system used to capture the plurality of other images, especially where there is no survey points captured within the other images, thereby allowing for more accurate and reliable mapping products by using or discarding some of the other images. For example, only some of the other images with an error meeting a threshold (e.g., <0.2 m) are to be provided to a service (e.g., digital map making service).

In one embodiment, the other images are taken subsequent to the training images. In another embodiment, the other images do not depict any survey points.

Figure 2:
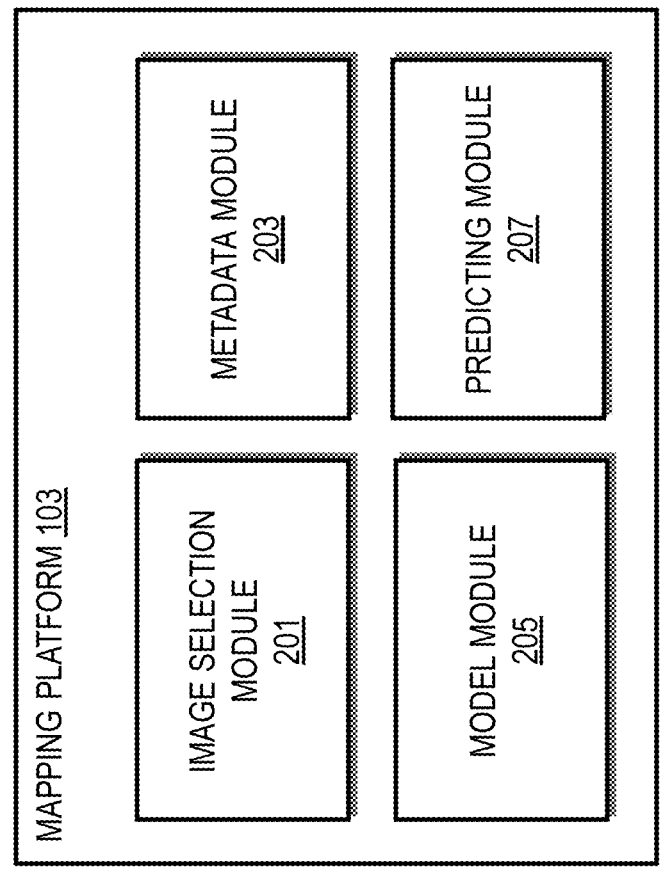
FIG. 2 is a diagram of components of a mapping platform capable of predicting a pose error for a sensor system based on a trained machine learning model, according to one embodiment.

In one embodiment, as shown in FIG. 2, the mapping platform 103 includes one or more components for predicting a pose error for a sensor system based on a trained machine learning model, according to the various embodiments described herein. It is contemplated that the functions of these components may be combined or performed by other components of equivalent functionality. In this embodiment, the mapping platform 103 includes an image selection module 201, meta data module 203, model module 205, and a predicting module 207. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100 (e.g., a component of the services platform 113, services 115a-115n (also collectively referred to as services 115), vehicle 101, UE 107, application 109 executing on the UE 107, etc.). In another embodiment, one or more of the modules 201-207 may be implemented as a cloud-based service, local service, native application, or combination thereof. The functions of the mapping platform 103 and the modules 201-207 are discussed with respect to FIGS. 3-6 below.

Figure 3:
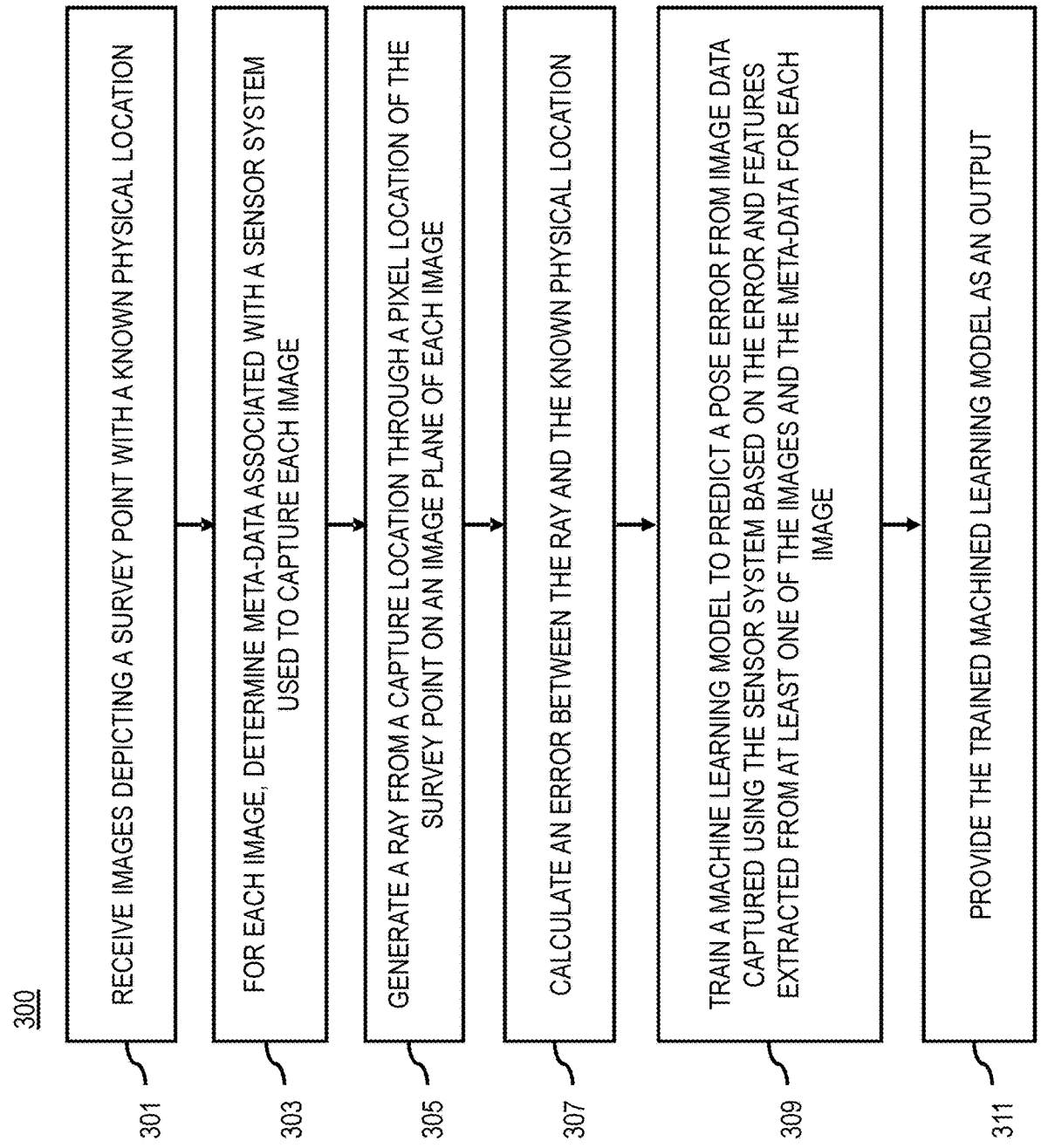
FIG. 3 is a flowchart of a process for predicting a pose error for a sensor system based on a trained machine learning model.
Figure 9:
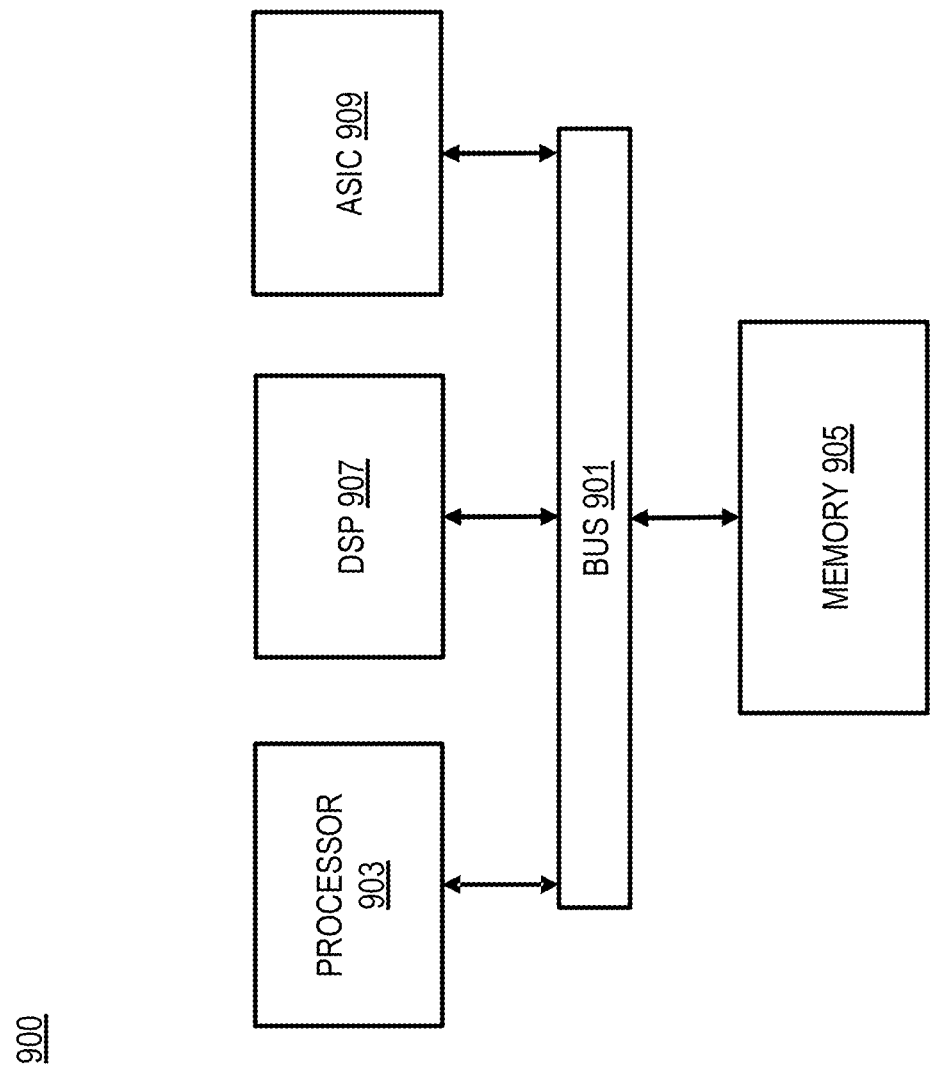
FIG. 9 is a diagram of a chip set that can be used to implement an embodiment.

FIG. 3 is a flowchart of a process for predicting a pose error for a sensor system based on a trained machine learning model, according to one embodiment. In various embodiments, the mapping platform 103 and/or any of the modules 201-207 may perform one or more portions of the process 300 and may be implemented in, for instance, a chip set including a processor and a memory as shown in FIG. 9. As such, the mapping platform 103 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

The mapping platform 103 initiates at least one drive by a vehicle configured with the sensor system (e.g., GPS, IMU, camera, LiDAR, Radar, etc.) to capture the plurality of images in diverse geographical areas with different environmental characteristics, to obtain variations in the quality of the positioning signals. In one embodiment, the mapping platform 103 selects the survey point based on a presence of an environmental characteristic within a proximity threshold of the known physical location. The at least one environmental characteristic includes a tree canopy, an open sky area, an urban canyon, and/or an natural canyon.

In step 301, the image selection module 201 receives a plurality of images depicting a survey point (e.g., training images captured by the sensor system, retrieved from image databases, etc.). In one embodiment, the images may be taken by sensors (e.g., GPS, IMU, camera, LiDAR, Radar, etc.) associated with a sensor system, e.g., mounted on the vehicle 101. In another embodiment, the images are retrieved from one or more image databases provided by the service platform 113 that provides services 115a-115n, the geographic database 123, and/or by content providers 125a-125n, etc. The survey point has a known physical location, such as a real-world location given by <Latitude, Longitude, Elevation> or equivalent. Examples of the survey points with known physical location include but are not limited to ground control points whose locations have been precisely surveyed. By way of example, the system 100 retrieves from the geographic database 123 ground control points (GCP) of multiple continents that were obtained through third-party surveyors. For each GCP, annotators label the pixel position in a true street level imagery.

Features that repeat often within a designated area (i.e., not sparse or appear in numbers greater than the sparsity threshold) are not suited as ground control points because they can be more difficult to uniquely identify. For example, features such as dashes of a lane line, stripes in a crosswalk, multiple line paint intersections in restricted zones, zebra stripes, etc. that repeat often over small distances can be poor ground control point candidates. Urban ground control points may be corners and intersections of sidewalks, corners of pavement and parking lots, parking space lines and particularly the intersection of these lines, choice points at local high spots, etc. Rural ground control points may be bridge edges where meeting a road surface, sides of roads and paths where curving and/or intersecting with other roads and paths, bottoms of telephone poles and/or electrical towers, road and stream intersections, distinctly colored or shaped rocks, etc. These ground control points, for instance, can be collected by ground surveyors who go out in the field and use instruments like a theodolite, measuring tape, three-dimensional (3D) scanner, satellite-based location sensors (e.g., GPS/GNSS), level and rod, etc. to measure the locations of ground control points with high accuracy.

In step 303, for each image of the plurality of images, the metadata module 203 determines meta-data associated with the sensor system used to capture the image, such as physical specifications, optical characteristics, and/or the like. In one embodiment, the sensor system is a as a satellite-based positioning system with meta-data listed in Table 1. The meta-data indicates at least a capture location of the sensor system when the image was captured.

GPS receiver identifier
Latitude
Longitude
Altitude
Fix time
Horizontal accuracy
Vertical accuracy
Position Dilution of Precision (PDOP)
Horizontal Dilution of Precision (HDOP)
Vertical Dilution of Precision (VDOP)
Time Dilution of Precision (TDOP)
Fix type
Rotational Degree of Freedom
Translational Degree of Freedom
Uncertainty in Rotational Degree of Freedom
Uncertainty in Translational Degree of Freedom
Correction age
Station ID
Satellite constellations used for position estimation
Number of satellites visible in each constellation
Whether GPS receiver in sync with satellites
Average horizontal accuracy
Average vertical accuracy
Number of positions averaged
Standard deviation
. . .

In another embodiment, the sensor system used to capture the image is an inertial measurement unit (IMU) with meta-data such as latitude, longitude, altitude, velocity, pitch, roll, and true heading, etc. In yet another embodiment, the sensor system used to capture the image is a GPS/IMU system that uses the GPS when GPS signals are available, and uses the IMU when GPS signals are unavailable, such as in tunnels or buildings, or when there is electronic interference, etc.

In another embodiment, the sensor system used to capture the image is a Light Detection and Ranging (LIDAR) system. Lidar data was delivered in an industry format called LAS. Each LAS file contains a header (metadata of the lidar survey) followed by individual records for each laser pulse recorded. The header holds attribute data on the lidar survey itself: data extents, a flight date, a flight time, a number of point records, a number of points by return, a applied data offset, and an applied scale factor. The lidar point attributes for each laser pulse include: location information, a GPS time stamp, an intensity, return number, a number of returns, point classification values, a scan angle, additional RGB values, a scan direction, an edge of flight line, user data, a point source ID, and waveform information.

In one embodiment, the metadata module 203 queries the meta-data to determine that the image depicts one or more survey points based on the meta-data. By way of example, the plurality of images is labeled with known pixel location data of the survey points as respectively depicted in the images. The known pixel location data indicate which pixels of the image correspond to survey points that are present in the image. The known pixel location data can be used to determined pixel correspondences between multiple images to determine a real world three-dimensional location of the survey point (e.g., an intersection feature) comprising a latitude, longitude, and elevation. The images can also include multiple images of the same survey point e.g., captured at different times, from different sources, etc.).

In another embodiment, the metadata module 203 extracts a plurality of map features from each of the images, compares the geometry of the map features with the geometry data of the survey points from the image databases, and labels/identifies one or more of the features as the survey point in the images.

Labeling, for instance, refers to identifying pixels or groups of pixels in the images that correspond to the feature or features, typically but not necessarily by a human. In addition or alternatively, the pixels of the selected images can be detected by automated machine processes. For example, the metadata module 203 can detect any map feature that is visible in the image using, for instance, a computer vision system 117 in combination with a machine learning system 119 (e.g., a neural network) to recognize the pixels of the images that correspond to the visible feature. For example, the identified feature or features can include but are not limited to a survey point. While any type of visible or photo-identifiable features can be used according to the embodiments described herein, survey points (e.g., ground control points) are particularly suited for automated identification (e.g., via the computer vision system 117) because they have a consistent definition, and are uniquely identifiable.

To determine or label pixel location data of a survey point, the model module 205 can process the images using image recognition or equivalent to identify the pixels of each image corresponding to the survey points. In other words, following the identification of candidate survey points in several top down images, corresponding image pixel locations are identified. In one embodiment, for each survey point (e.g., a line intersection), the corresponding pixel coordinates in two or more images are recorded, creating a pixel correspondence of the form $\{(u_1, v_1), (u_2, v_2), \ldots\}$ or equivalent. Here, u and v are pixel locations of the same survey point depicted in the images (e.g., pixel locations along the x and y axis respectively of a pixel grid comprising the image), and the subscript indicates in which image the feature is labeled.

In step 305, for each annotated/labeled image, the model module 205 generates a ray from the capture location through a pixel location of the survey point on an image plane of the image. The model module 205 determines an image plane physical location of an image plane of the first image based on the sensor system pose data, one or more intrinsic parameters such as physical specifications, optical characteristics, and/or the like. The model module 205 can use the sensor system pose data and/or system technical specifications (e.g., focal length, camera lens, aperture, exposure, etc.) to locate a physical location of the image plane within the common coordinate system. The image plane refers to the apparent location in three-dimensional space of the image, thereby enabling the model module 205 to translate each pixel location (including feature-labeled or detected pixel locations) in the first image into the common coordinate system.

Figure 4B:
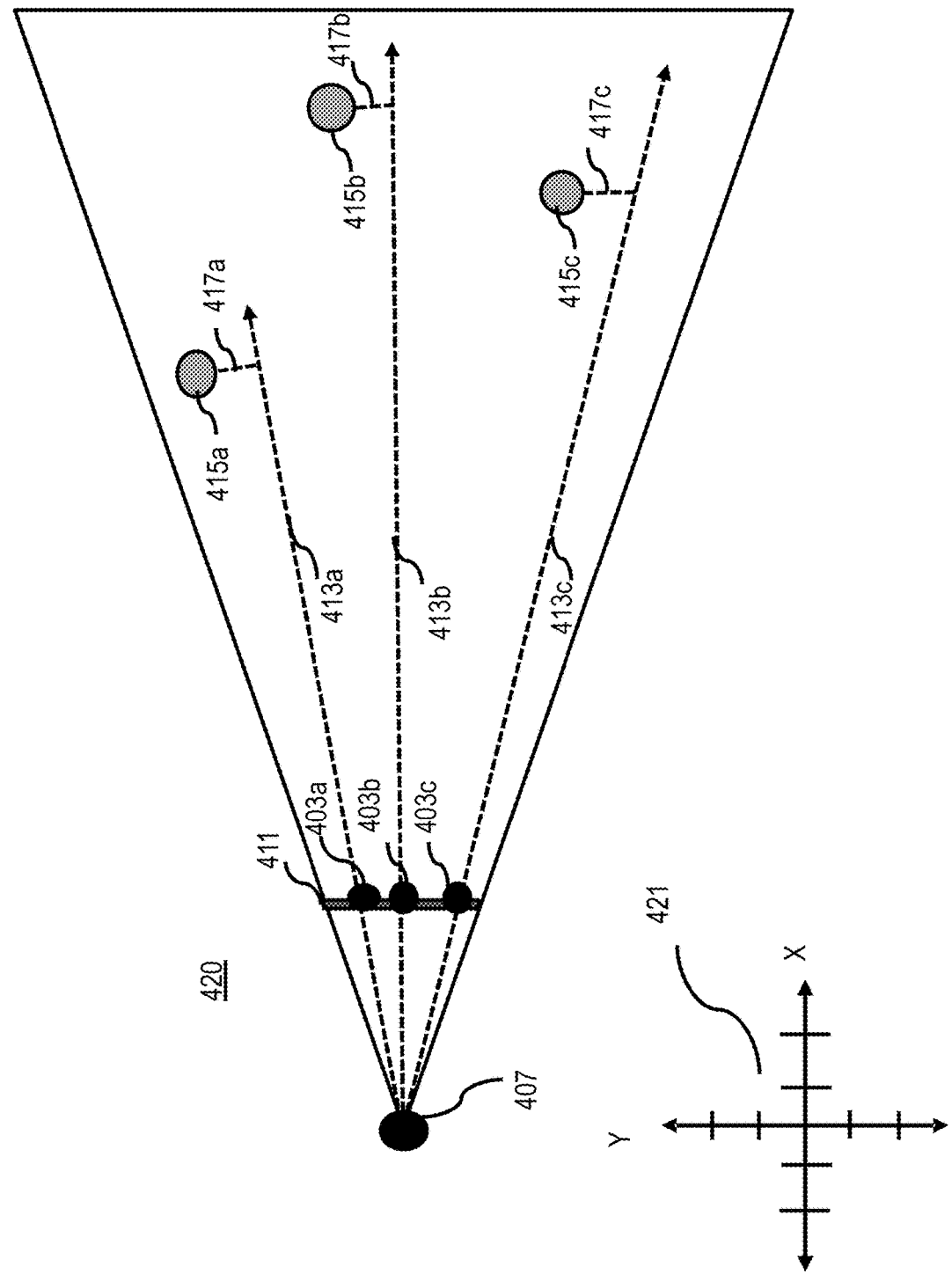
FIG. 4B is a top view of the example of projecting rays to train a machine learning model to predict a pose error from image data, according to one embodiment.

FIG. 4A is a prospective view 400 of an example of projecting rays to train a machine learning model to predict a pose error from image data, according to one embodiment. As shown in the example of FIG. 4A, image 401 is being processed to train a machine learning model to predict a pose error from image data captured using the sensor system (e.g., GPS, IMU, camera, LiDAR, Radar, etc.). Image 401 is labeled with survey points with known locations, detected at pixel locations 403a, 403b, and 403c. The model module 205 uses the sensor system pose data associated with the image 401 to determine the respective capture location 407 with respect to a common or global coordinate system 409. The model module 205 also uses the sensor system pose data and/or the meta-data associated with the sensor system to determine the physical location of the image plane 411, which represents the location and orientation of the image 401 with respect to the coordinate system 409 (e.g., a field of view corresponding to image 401). FIG. 4B is a top view 420 of the example of projecting rays to train the machine learning model to predict a pose error from image data, observing from the top 421 of the common or global coordinate system 409, according to one embodiment. In one embodiment, for each of the labeled or detected pixel locations 403a-403c of the image 401, the model module 205 generates respective rays 413a-413c originating from the capture location 407 through each of the labeled or detected pixel locations 403a-403c.

Figure 5A:
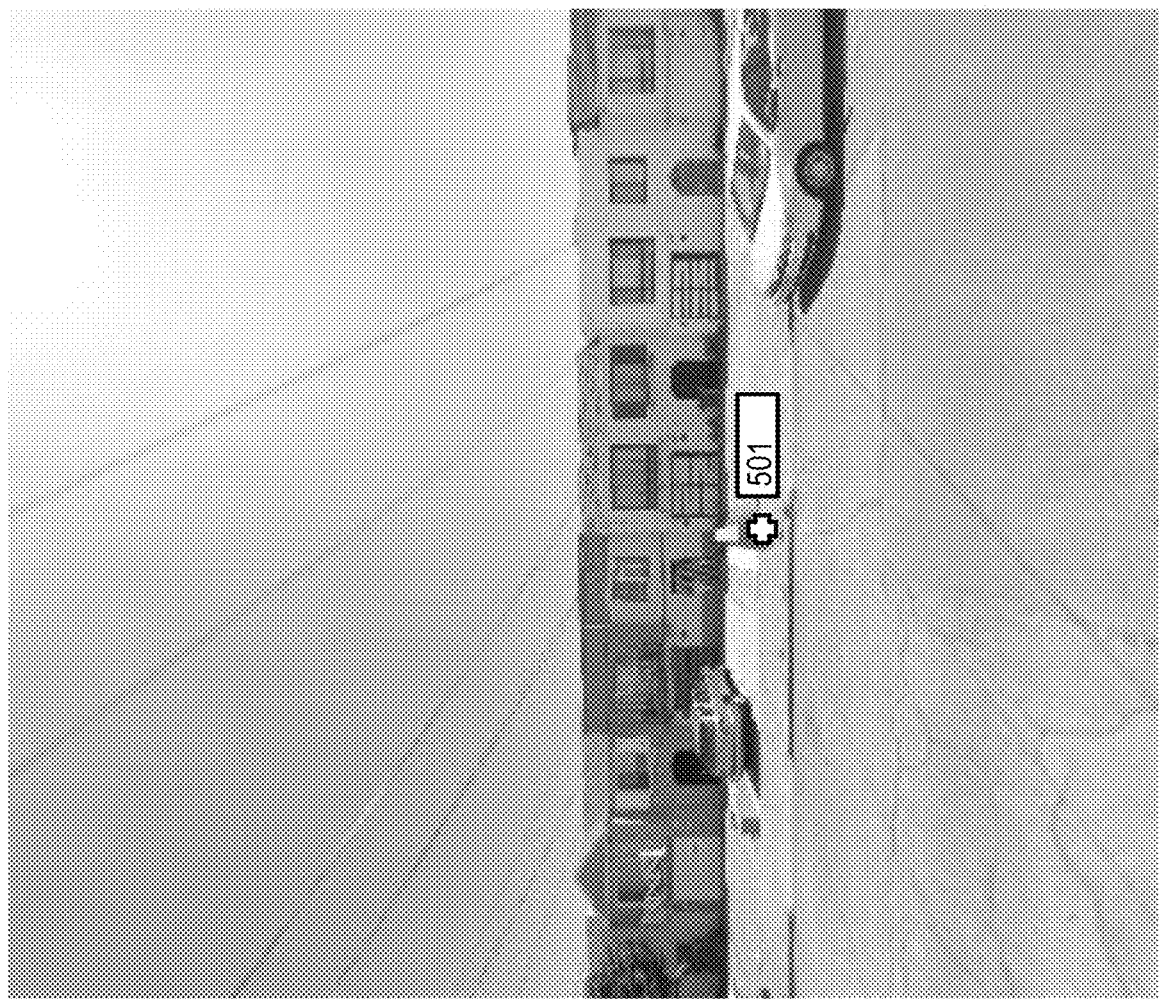
FIGS. 5A-5B are diagrams illustrating examples of multiple view imagery of a survey point, according to one embodiment.
Figure 5B:

The model module 205 also uses the known locations of the survey points 415a, 415b, and 415c to determine the physical location of survey points 415a-415c with respect to the global coordinate system 409. FIGS. 5A-5B are diagrams illustrating examples of multiple view imagery of a survey point, according to one embodiment. In this example, FIG. 5A illustrates a first street-level image 500 taken by a sensor system (e.g., GPS, IMU, camera, LiDAR, Radar, etc.), that depicts a survey point 501 with a known physical location. The image 500 contains metadata such as sensor system pose data. The metadata can be used to estimate the 3D position of the survey point 501. The metadata can also be used to estimate the 3D position of a capture location.

FIG. 5B illustrates a top down image 520 with the overlaid position of the capture location 521 used to take the image 500 and the survey point 501 with a known physical location. The model module 205 can train a machine learning model using the known location of the survey point 501 according to the embodiments described below.

In step 307, the model module 205 uses the above-discussed meta-data associated with the sensor system (e.g., GPS, IMU, camera, LiDAR, Radar, etc.) to determine the deviation between 3D coordinates of a survey point and the ray connecting the capture location with the pixel location, and calculates an error between the ray generated for the image and the known physical location.

In one embodiment, the model module 205 can iteratively evaluate the closeness between the rays 413a-413c and the respective survey points with known locations 415a-415c. For example, the first ray 413a passes by the known location of a first survey point 415a. To determine the closeness values, the model module 205 computes a line segment 417a between the first ray 413a and the location of the first survey point 415a. As shown in FIGS. 4A-4B with respect to the first ray 413a, the first line segment 417a is drawn so that it is orthogonal to the known location of the first survey point 415a. In one embodiment, this orthogonality helps ensure that the line segments are the shortest or minimum distance between the first ray 413a and the known location of the first survey point 415a.

In one embodiment, the model module 205 uses the minimum perpendicular distances 417a-417c between the true locations of the survey points 415a-415c and the corresponding rays 413a-413c as the discrepancy/error of the sensor system (e.g., GPS, IMU, camera, LiDAR, Radar, etc.). In another embodiments, the model module 205 provides an aggregation of minimum distance data indicating the pose error of the sensor system. By way of example, the model module 205 aggregates the plurality of images based on a threshold distance from the known physical location of the survey point. The minimum perpendicular distances 417a-417c can be aggregated using different measures of central tendency (e.g., mean, median, mode, and so forth). In yet another embodiment, the model module 205 uses a weighting scheme based on the inverse distance of the survey points to the capture location 407, since the confidence in observing a physical point by the sensor system changes inversely as a function of the distance from the capture location 407. In yet another embodiment, the model module 205 calculates the deviation of the aggregated minimum perpendicular distances to provide an output associated with the pose error of the sensor system.

In step 309, the model module 205 trains a machine learning model to predict a pose error from image data captured using the sensor system (e.g., GPS, IMU, camera, LiDAR, Radar, etc.) based on the computed error data (e.g., the minimum perpendicular distances, the aggregated perpendicular distances, the weighted perpendicular distances, the deviation of the aggregated perpendicular distances, etc.) in combination with a plurality of features (e.g., survey points) extracted from at least one of the image and the meta-data for the image (e.g., the capture location, etc.). By way of example, the model module 205 can learn a mapping from the meta-data to the computed errors using one or more supervised machine learning schemes, to model relationships and dependencies between the meta-data and the computed errors so as to predict a pose error for other/new images captured by the sensor system based on those relationships which it learned from the training image data. For example, the supervised machine learning schemes may be random forests, support vector machines (SVM), nearest neighbor, naive bayes, linear regression, neural networks, etc. In step 311, the model module 205 provides the trained machined learning model as an output.

The trained machine learning model is used to process a plurality of other images to predict the pose error for the sensor system used to capture the plurality of other images. In one embodiment, the predicting module 207 applies the trained machined learning model to other/new images that do not depict survey points. For every image captured with the sensor system, the predicting module 207 can run the trained machine learning model to understand the pose errors and whether it meets the specifications for map making. By way of example, the plurality of other images is provided to a service based on determining that the pose error meets a specification of the service, such as a digital map making service.

Referring back to the satellite-based positioning system example, the predicting module 207 can use the meta-data fields listed in Table 1 as predictors X to predict/estimate the 3D error y described above as a pose error. In short, the metadata fields related to positions, velocities, and orientations of cameras, the confidence (e.g., standard deviations) of the reported positions, velocities, and orientations, the number of GNSS satellites visible at the time of collection, the horizontal and vertical dilution of precision of the GNSS constellation at the time of collection, etc.

In other embodiments, wherein the sensor system includes a LiDAR system or a Radar system, the data model module 205 can similarly determine the estimated location of each survey point 415, except in these instances, the point position is within a point cloud generated by the LiDAR or Radar system rather than on an image plane as described above. The model module 205, for instance, identifies the positions of the survey points 415a-415c in the cloud and measures the distance from them to the surveyed positions to determine the pose error associated with the sensor system.

Any supervised learning method could be used to train a predictive model given these quantities as training data. In one embedment, a Random Forest Classifier is applied to train the model. By way of example, the trained machine learning model translates the 3D errors y into 3 classes: "good" ($0<=y<0.2$ meter), "maybe" ($0.2<=y<0.5$ meter), and "bad" ($y>=0.5$ meter). The quality of the trained machine learning model can be evaluated using a subset of the training images annotated with survey points.

Figure 6B:
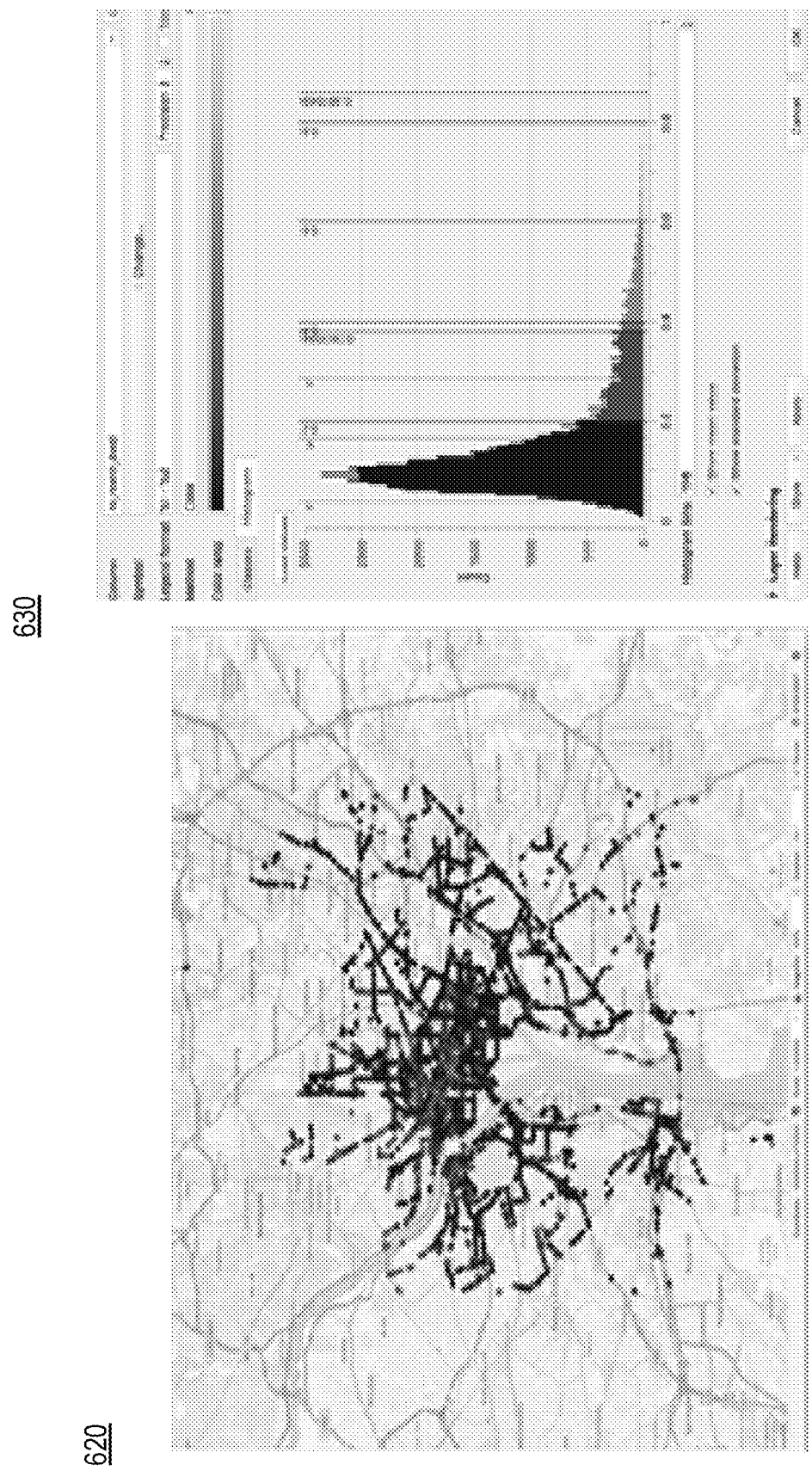

FIGS. 6A-6B are diagrams of user interfaces illustrating examples of predicted pose errors of different classes for images captured in Washington DC by a sensor system (e.g., GPS, IMU, camera, LiDAR, Radar, etc.), according to one embodiment. FIG. 6A show a map view 600 and a histogram 610 of the predicted probabilities for the "good" class ($0<=y<0.2$ meter) for a number of images captured in Washington DC. The histogram 610 is a representation of an estimated probability distribution of 0<pose error<0.2 meter data points, with a mean $\mu=$_____ meter and a standard deviation $\sigma=$_____. The map view 600 is a scatter plot of the capture locations marked by a predicted class probability, and the histogram 610 shows the number of captures predicted to have a certain class probability. To construct the histogram 610, the entire pose error range of values 0 to 0.2 meter is divided into a series of intervals/bins (e.g., 76), and then count how many pose error values fall into each interval. The bins are adjacent, non-overlapping, and of equal size.

FIG. 6B show a map view 620 and a histogram 630 of the predicted probabilities for the "bad" class ($y>=0.5$ meter) for a number of images captured in Washington DC. The map view 620 is a scatter plot of the capture locations marked by a predicted class probability, and the histogram 630 shows the number of captures predicted to have a certain class probability. The histogram 620 is a representation of an estimated probability distribution of pose error$>=0.5$ meter data points, with a mean $\mu=$_____ meter and a standard deviation $\sigma=$_____. To construct the histogram 630, the entire pose error range of values 0.5 to meters is divided into a series of intervals/bins (e.g., 156), and then count how many pose error values fall into each interval.

FIGS. 6A-6B show that the "good" probabilities are higher on average than the "bad" probabilities, which indicates that Washington DC has fairly good positioning. In one embodiment, the predicting module 207 flags the captures with high "bad" probabilities as unsuitable for mapmaking, or for targeted correction, or for additional collections.

In another embodiment, the predicting module 207 flags certain sensor system pose data when the aggregation of minimum distances is greater than an error threshold. The error threshold represents, for instance, the cutoff minimum distance value between the generated rays 413a-413c and the known location of the survey points 415a-415c that will not be used for mapmaking, or for targeted correction, or for additional collections.

Returning to FIG. 1, as shown, the system 100 includes the mapping platform 103 for predicting a pose error for a sensor system (e.g., GPS, IMU, camera, LiDAR, Radar, etc.) based on a trained machine learning model according to the embodiments described herein. For example, with respect to autonomous, navigation, mapping, and/or other similar applications, the mapping platform 103 can detect quality of sensor system pose data based on using ground control points of known quality, according to the various embodiments described herein. In one embodiment, the machine learning system 119 of the mapping platform 103 includes a Random Forest Classifier or other machine learning system to make predictions from machine learning models. For example, when the input to the machine learning model are images with sensor system pose data of survey points with known physical locations used for the embodiments described herein, the output can include the aggregation of minimum distances that can be used to determine the quality of the sensor system pose data.

In one embodiment, the machine learning system 119 and/or the computer vision system 117 also have connectivity or access over a communication network 121 to a geographic database 123 which stores the imagery for different sources (e.g., with different views or perspectives), extracted features, features correspondences, quality of sensor system pose data, derived maps, etc. generated according to the embodiments described herein. In one embodiment, the geographic database 123 includes representations of features and/or other related geographic features determined from feature correspondences to facilitate visual odometry to increase localization accuracy. In one embodiment, the machine mapping platform 103 has connectivity over a communication network 121 to the services platform 113 that provides one or more services 115. By way of example, the services 115 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 115 uses the output of the mapping platform 103 (e.g., location corrected images, features, etc.) to localize the vehicle 101 or UE 107 (e.g., a portable navigation device, smartphone, portable computer, tablet, etc.) and/or provide services 115 such as navigation, mapping, other location-based services, etc.

In one embodiment, the mapping platform 103 may be a platform with multiple interconnected components. The mapping platform 103 may include multiple servers, intelligent networking devices, computing devices, components and corresponding software for providing parametric representations of lane lines. In addition, it is noted that the mapping platform 103 may be a separate entity of the system 100, a part of the one or more services 115, a part of the services platform 113, or included within the UE 107 and/or vehicle 101.

In one embodiment, content providers 125a-125m (collectively referred to as content providers 125) may provide content or data (e.g., including geographic data, parametric representations of mapped features, etc.) to the geographic database 123, the mapping platform 103, the services platform 113, the services 115, the UE 107, the vehicle 101, and/or an application 109 executing on the UE 107. The content provided may be any type of content, such as map content, textual content, audio content, video content, image content, etc. In one embodiment, the content providers 125 may provide content that may aid in the detecting and classifying of lane lines and/or other features in image data and estimating/predicting pose errors of a sensor system (e.g., GPS, IMU, camera, LiDAR, Radar, etc.). In one embodiment, the content providers 125 may also store content associated with the geographic database 123, mapping platform 103, machine learning system 119, computer vision system 117, services platform 113, services 115, UE 107, and/or vehicle 101. In another embodiment, the content providers 125 may manage access to a central repository of data, and offer a consistent, standard interface to data, such as a repository of the geographic database 123.

In one embodiment, the UE 107 and/or vehicle 101 may execute a software application 109 to capture image data or other observation data for predicting a pose error for a sensor system (e.g., GPS, IMU, camera, LiDAR, Radar, etc.) based on a trained machine learning model, according to the embodiments described herein. By way of example, the application 109 may also be any type of application that is executable on the UE 107 and/or vehicle 101, such as autonomous driving applications, mapping applications, location-based service applications, navigation applications, content provisioning services, camera/imaging application, media player applications, social networking applications, calendar applications, and the like. In one embodiment, the application 109 may act as a client for the mapping platform 103 and perform one or more functions associated with estimating the quality of sensor system pose data alone or in combination with the machine learning system 119.

By way of example, the UE 107 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with the vehicle 101 or be a component part of the vehicle 101.

In one embodiment, the UE 107 and/or vehicle 101 are configured with various sensors (e.g., GPS, IMU, camera, LiDAR, Radar, etc.) for generating or collecting environmental image data (e.g., for processing by the mapping platform 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 107 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 107 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 107 and/or vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 103, machine learning system 119, computer vision system 117, services platform 113, services 115, UE 107, vehicle 101, and/or content providers 125 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
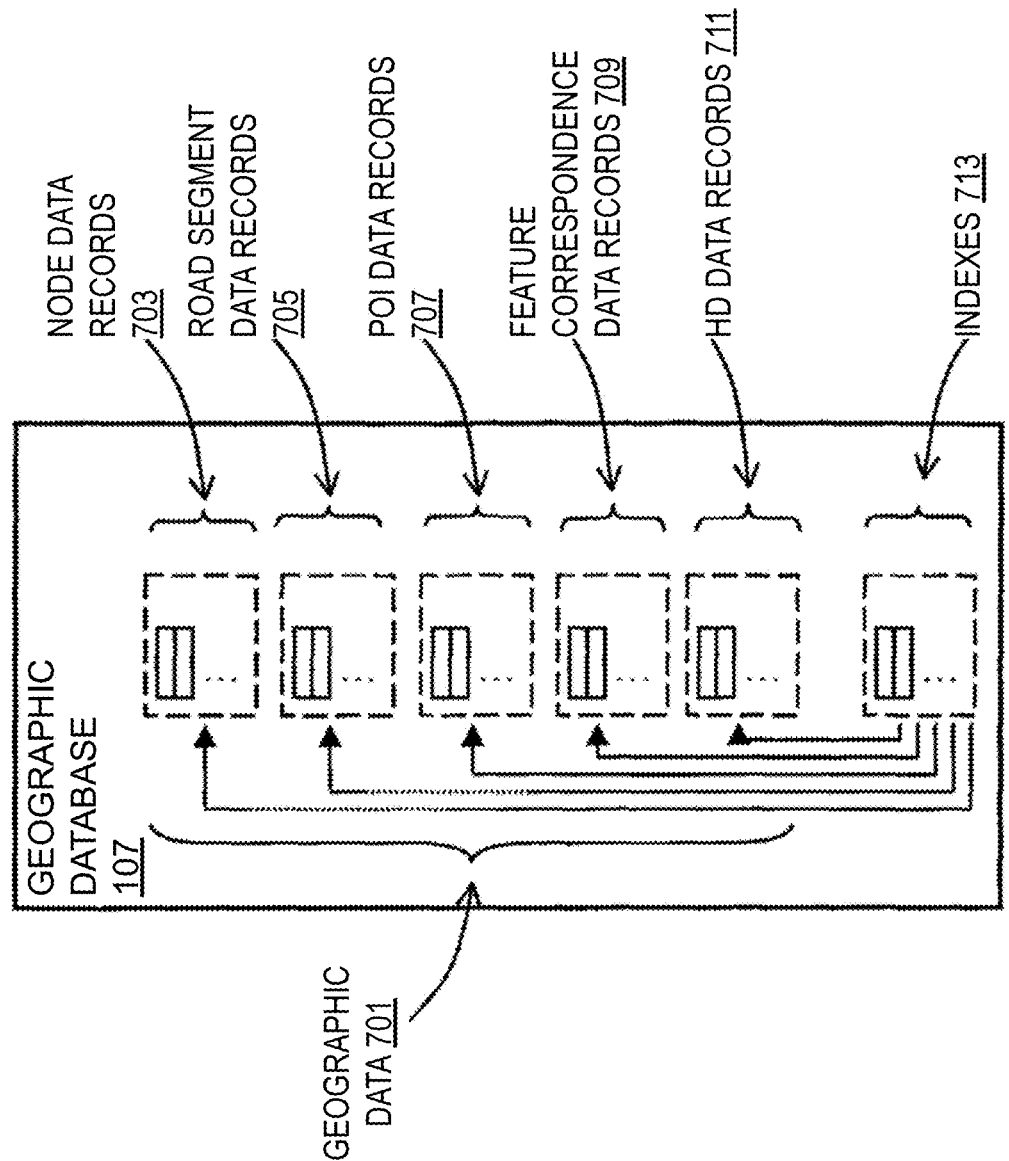
FIG. 7 is a diagram of a geographic database, according to one embodiment.

FIG. 7 is a diagram of a geographic database, according to one embodiment. In one embodiment, the geographic database 123 includes geographic data 701 used for (or configured to be compiled to be used for) mapping and/or navigation-related services, such as for video odometry based on the mapped features (e.g., lane lines, road markings, signs, etc.). In one embodiment, the geographic database 123 includes high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 711) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 703, road segment or link data records 705, POI data records 707, feature correspondence data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 123. In one embodiment, the indexes 713 may be used to quickly locate data without having to search every row in the geographic database 123 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 707. The geographic database 123 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 123 can also include feature correspondence data records 709 for storing the identified feature correspondences (e.g., image-to-image correspondences, image-to-ground correspondences, etc.), camera geometry parameters, location corrected images, location corrected features, location corrected camera models/poses, as well as other related data used or generated according to the various embodiments described herein. Features refer to any feature that is photo-identifiable in the image including, but not limited to, physical features on the ground that can be used as possible candidates for survey points. In other words, it is contemplated that features refer to a broader category of photo-identifiable features including survey points.

By way of example, the feature correspondence data records 709 can be associated with one or more of the node records 703, road segment records 705, and/or POI data records 707 to support localization or visual odometry based on the features stored therein and the corresponding estimated quality and/or pose errors of the features. In this way, the records 709 can also be associated with or used to classify the characteristics or metadata of the corresponding records 703, 705, and/or 707.

In one embodiment, as discussed above, the HD mapping data records 711 model road surfaces and other map features to centimeter-level or better accuracy. The HD mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 711 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 711.

In one embodiment, the HD mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 125 in association with the services platform 113 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 107) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for predicting a pose error for a sensor system based on a trained machine learning model may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
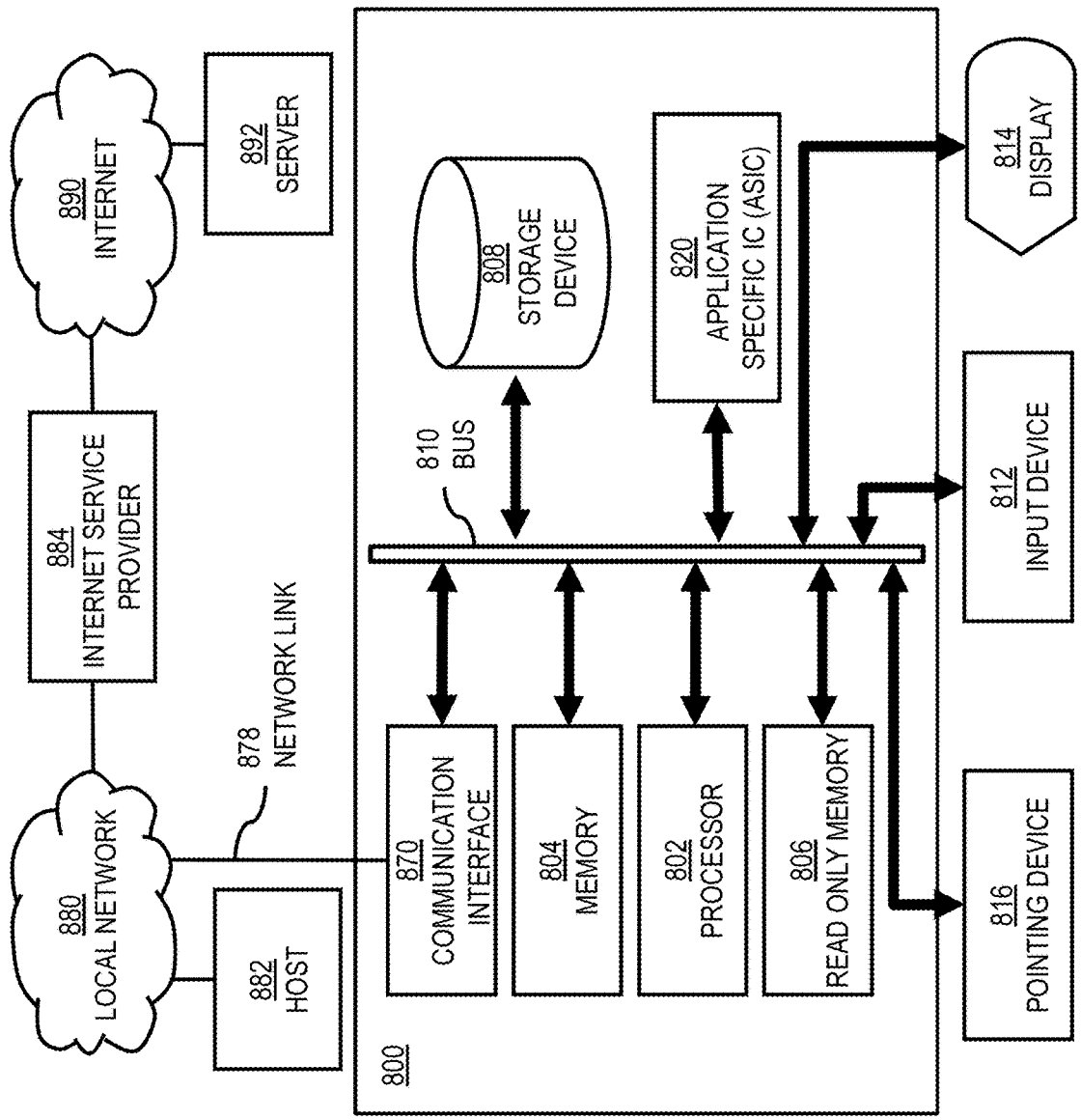
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to predict a pose error for a sensor system based on a trained machine learning model as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to predict a pose error for a sensor system based on a trained machine learning model. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for predicting a pose error for a sensor system based on a trained machine learning model. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for predicting a pose error for a sensor system based on a trained machine learning model, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 121 for predicting a pose error for a sensor system based on a trained machine learning model.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to predict a pose error for a sensor system based on a trained machine learning model as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to predict a pose error for a sensor system based on a trained machine learning model. The memory 905 also stores the data associated with or generated by the execution of the inventive steps.

Figure 10:
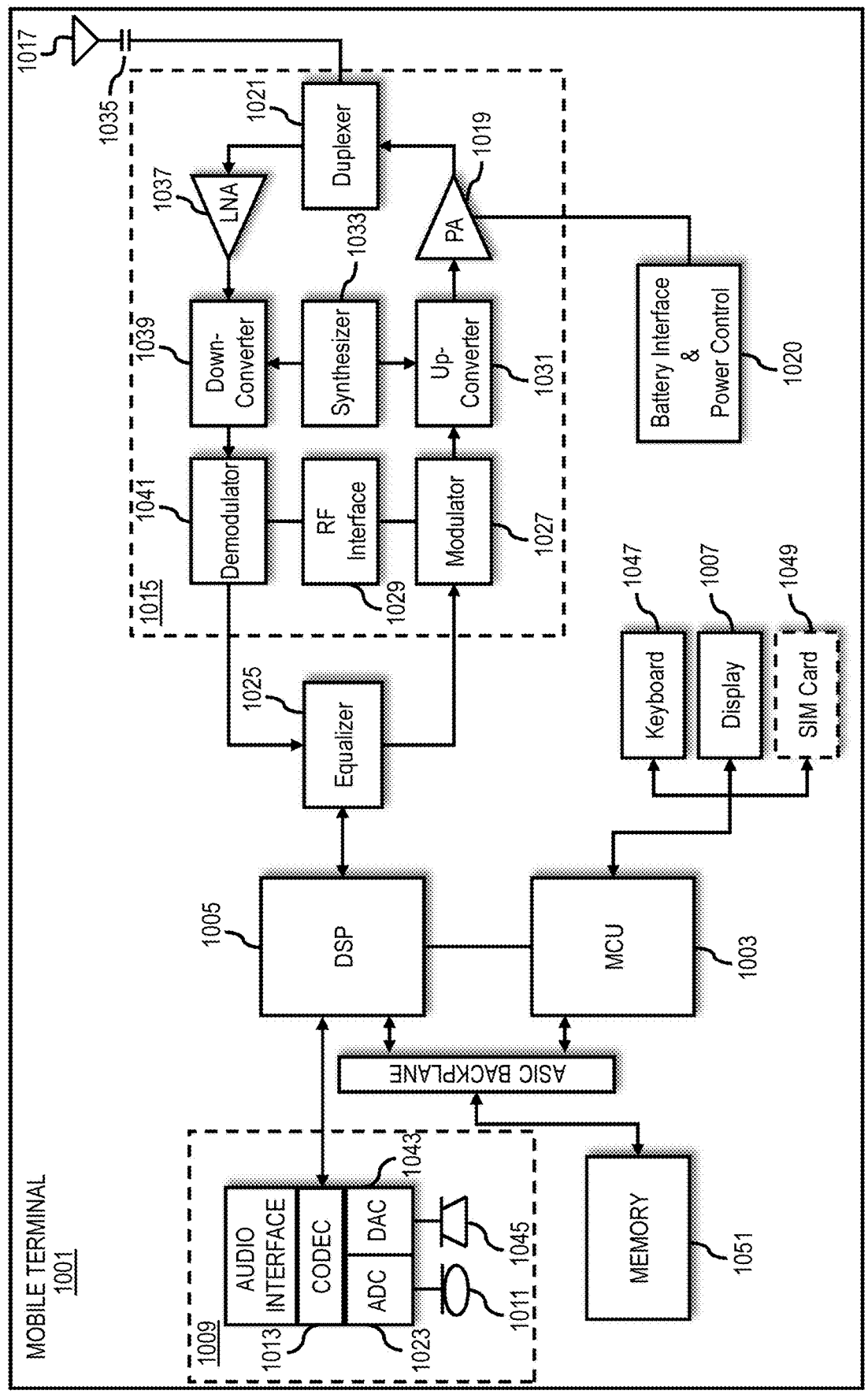
FIG. 10 is a diagram of a mobile terminal (e.g., handset, vehicle, or component thereof) that can be used to implement an embodiment.

FIG. 10 is a diagram of exemplary components of a mobile terminal (e.g., vehicle 101, UE 107, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to predict a pose error for a sensor system based on a trained machine learning model. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a plurality of images depicting a survey point, wherein the survey point has a known physical location;
    for each image of the plurality of images, determining meta-data associated with a sensor system used to capture said each image, wherein the meta-data indicates at least a capture location of the sensor system when said each image was captured;
    generating a ray from the capture location through a pixel location of the survey point on an image plane of said each image;
    calculating an error between the ray generated for said each image and the known physical location;
    training a machine learning model to predict a pose error from image data captured using the sensor system based on the error in combination with a plurality of features extracted from at least one of said each image and the meta-data; and
    providing the trained machined learning model as an output.

2. The method of claim 1, wherein the trained machine learning model is used to process a plurality of other images to predict the pose error for the sensor system used to capture the plurality of other images.

3. The method of claim 2, wherein the plurality of other images is provided to a service based on determining that the pose error meets a specification of the service.

4. The method of claim 3, wherein the service includes a digital map making service.

5. The method of claim 1, wherein the meta-data is generated from a positioning system.

6. The method of claim 5, wherein the positioning system includes a satellite-based positioning system, an inertial measurement unit, or a combination thereof.

7. The method of claim 1, further comprising:
    aggregating the plurality of images based on a threshold distance from the known physical location of the survey points.

8. The method of claim 1, further comprising:
    initiating at least one drive by a vehicle configured with the sensor system to capture the plurality of images.

9. The method of claim 1, further comprising:
    selecting the survey point based on a presence of an environmental characteristic within a proximity threshold of the known physical location.

10. The method of claim 9, wherein the at least one environmental characteristic includes a tree canopy, an open sky area, an urban canyon, a natural canyon, or a combination thereof.

11. An apparatus comprising:
    at least one processor; and
    at least one memory including computer program code for one or more programs, the at least one memory and the computer program code configured to, with the at least one processor, cause the apparatus to perform at least the following:
    receive a plurality of images depicting a survey point, wherein the survey point has a known physical location;
    for each image of the plurality of images, determine meta-data associated with a sensor system used to capture said each image, wherein the metadata indicates at least a capture location of the sensor system when said each image was captured;
    generate a ray from the capture location through a pixel location of the survey point on an image plane of said each image;
    calculate an error between the ray generated for said each image and the known physical location;
    train a machine learning model to predict a pose error from image data captured using the sensor system based on the error in combination with a plurality of features extracted from at least one of said each image and the meta-data; and
    provide the trained machined learning model as an output.

12. The apparatus of claim 11, wherein the trained machine learning model is used to process a plurality of other images to predict the pose error for the sensor system used to capture the plurality of other images.

13. The apparatus of claim 12, wherein the plurality of other images is provided to a service based on determining that the pose error meets a specification of the service.

14. The apparatus of claim 13, wherein the service includes a digital map making service.

15. The apparatus of claim 11, wherein the meta-data is generated from a positioning system.

16. The apparatus of claim 15, wherein the positioning system includes a satellite-based positioning system, an inertial measurement unit, or a combination thereof.

17. The apparatus of claim 11, wherein the apparatus is further caused to:
    aggregate the plurality of images based on a threshold distance from the known physical location of the survey points.

18. A non-transitory computer-readable storage medium carrying one or more sequences of one or more instructions which, when executed by one or more processors, cause an apparatus to perform:
    receiving a plurality of images depicting a survey point, wherein the survey point has a known physical location;
    for each image of the plurality of images, determining meta-data associated with a sensor system used to capture said each image, wherein the meta-data indicates at least a capture location of the sensor system when said each image was captured;
    generating a ray from the capture location through a pixel location of the survey point on an image plane of said each image;
    calculating an error between the ray generated for said each image and the known physical location;
    training a machine learning model to predict a pose error from image data captured using the sensor system based on the error in combination with a plurality of features extracted from at least one of said each image and the meta-data; and
    providing the trained machined learning model as an output.

19. The non-transitory computer-readable storage medium of claim 18, wherein the trained machine learning model is used to process a plurality of other images to predict the pose error for the sensor system used to capture the plurality of other images.

20. The non-transitory computer-readable storage medium of claim 19, wherein the plurality of other images is provided to a service based on determining that the pose error meets a specification of the service.

* * * * *